US006199378B1

(12) United States Patent
Aardema et al.

(10) Patent No.: US 6,199,378 B1
(45) Date of Patent: Mar. 13, 2001

(54) OFF-SETTING RATE OF PRESSURE RISE IN A FLUID SYSTEM

(75) Inventors: James A. Aardema, Plainfield; Thomas J. Hajek, Jr., Lockport; Douglas W. Koehler, Peoria; Edward W. Mate, Manhattan, all of IL (US); Vincent Triffaux, Strepy-Bracquegnies (BE)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/400,683

(22) Filed: Sep. 21, 1999

(51) Int. Cl.[7] ..................... F16D 31/02
(52) U.S. Cl. ..................... 60/468
(58) Field of Search ..................... 60/468, 494

(56) References Cited

U.S. PATENT DOCUMENTS 4,955,461 9/1990 Keir ..................... 91/443
5,138,838 8/1992 Crosser ..................... 60/433
5,396,923 3/1995 Allen et al. .
5,813,226 9/1998 Krone et al. ..................... 60/327

FOREIGN PATENT DOCUMENTS 2111250 6/1983 (GB) .

*Primary Examiner*—F. Daniel Lopez
(74) *Attorney, Agent, or Firm*—J. W. Burrows

(57) ABSTRACT

A control arrangement operates in conjunction with a control scheme to control the maximum pressure level within a conduit network of a fluid system without the need to have high flow pressure relief valves. The control arrangement provides a low flow pressure relief valve connected in parallel with an electrically actuated valve mechanism to trim any over-pressure conditions so that the control scheme has more time to move the electrically actuated valve mechanism to a flow bypassing, pressure relieving position.

7 Claims, 3 Drawing Sheets

OFF-SETTING RATE OF PRESSURE RISE IN A FLUID SYSTEM

TECHNICAL FIELD

This invention relates generally to the rate of pressure rise in a fluid system and more particularly to off-setting or controlling the length of time that it takes the pressure of a fluid in the fluid system to increase beyond a predetermined level.

BACKGROUND ART

Pressure relief valves are well known in the art to control the pressure level of a fluid in a fluid system. Relief valves are normally designed to open at some predetermined level and bypass a part of or all of the fluid flow from the pump to the reservoir or to some other low pressure system. Likewise relief valves have been used to control the pressure level of pilot fluid in pilot control lines in order to control the maximum pressure level within the respective pilot control lines. U.S. Pat. No. 5,813,226 which issued Sep. 29, 1998 and assigned to the assignee hereof teaches the use of a control scheme for controlling the maximum pressure level within a fluid system without the use of separate pressure relief valves. In this pressure control scheme, a control valve is used to relieve the pressure within a conduit to control the maximum pressure level. In this control scheme, it is necessary to monitor the level of pressure within the system or conduit and when the pressure level of the fluid is predicted to reach its maximum level an electronic controller directs an electrical signal to the control valve moving it towards an open position in order to control the level of pressure therein. In order to control the pressure level within a conduit or system in which the rate of pressure rise is very rapid, the control scheme of the above noted patent functions to anticipate an increase in pressure rising beyond the predetermined maximum level and initiates movement of the control valve towards an open position prior to the maximum pressure level being reached so that the control valve would be at or very near open once the pressure raises to the maximum level. This permits the control valve to open in time to minimize any "pressure overshoot" or sometimes referred to as "pressure spike". "Pressure overshoot" is any pressure of the fluid that exceeds the preset maximum pressure level. If the rate of pressure rise is to rapid, it cannot be anticipated quick enough and the system will still be subjected to "pressure overshoot". Another potential limitation with the control scheme of the above noted patent, is that when the system is shut down and the electronic controller is turned off, the fluid within any of the conduits between the control valve and the actuator is trapped and any thermal expansion could cause damage or failure of the conduits.

Accordingly, the present invention is directed to overcoming one or more of the problems as set forth above.

DISCLOSURE OF THE INVENTION

In one aspect of the present invention, a control arrangement is provided for offsetting the rate of pressure rise within a fluid conduit network of a fluid system. The fluid system having a source of pressurized fluid, a reservoir, a fluid actuator, an electrically actuated control valve mechanism connected to the source of pressurized fluid, the reservoir and the fluid actuator. The fluid conduit network of the fluid system having a predetermined maximum operating pressure level. The control arrangement including an input controller connected to the electrically actuated control valve mechanism and operative to generate an electrical signal representative of the desired input and an electronic controller operative to receive the signal from the input controller and direct an output signal therefrom to the electrically actuated control valve mechanism to control movement of the actuator. The control arrangement also including a pressure sensor arrangement operative to sense the pressure within the fluid conduit network of the fluid system and deliver a signal representative thereof to the electronic controller, a control scheme operative in response to the sensed pressure signal to anticipate a pressure level that would exceed the predetermined maximum pressure level and direct an electrical signal to the electrically actuated control valve mechanism to bypass a portion of the fluid flow in the system to the reservoir to relieve the overpressure condition, and a low flow pressure relief valve disposed between the fluid conduit network and the reservoir and operative in response to the pressure level in the fluid conduit network exceeding the predetermined pressure level to bypass a small volume of pressurized fluid to trim the level of any overpressure condition.

BEST MODE FOR CARRYING OUT THE INVENTION

Figure 1:
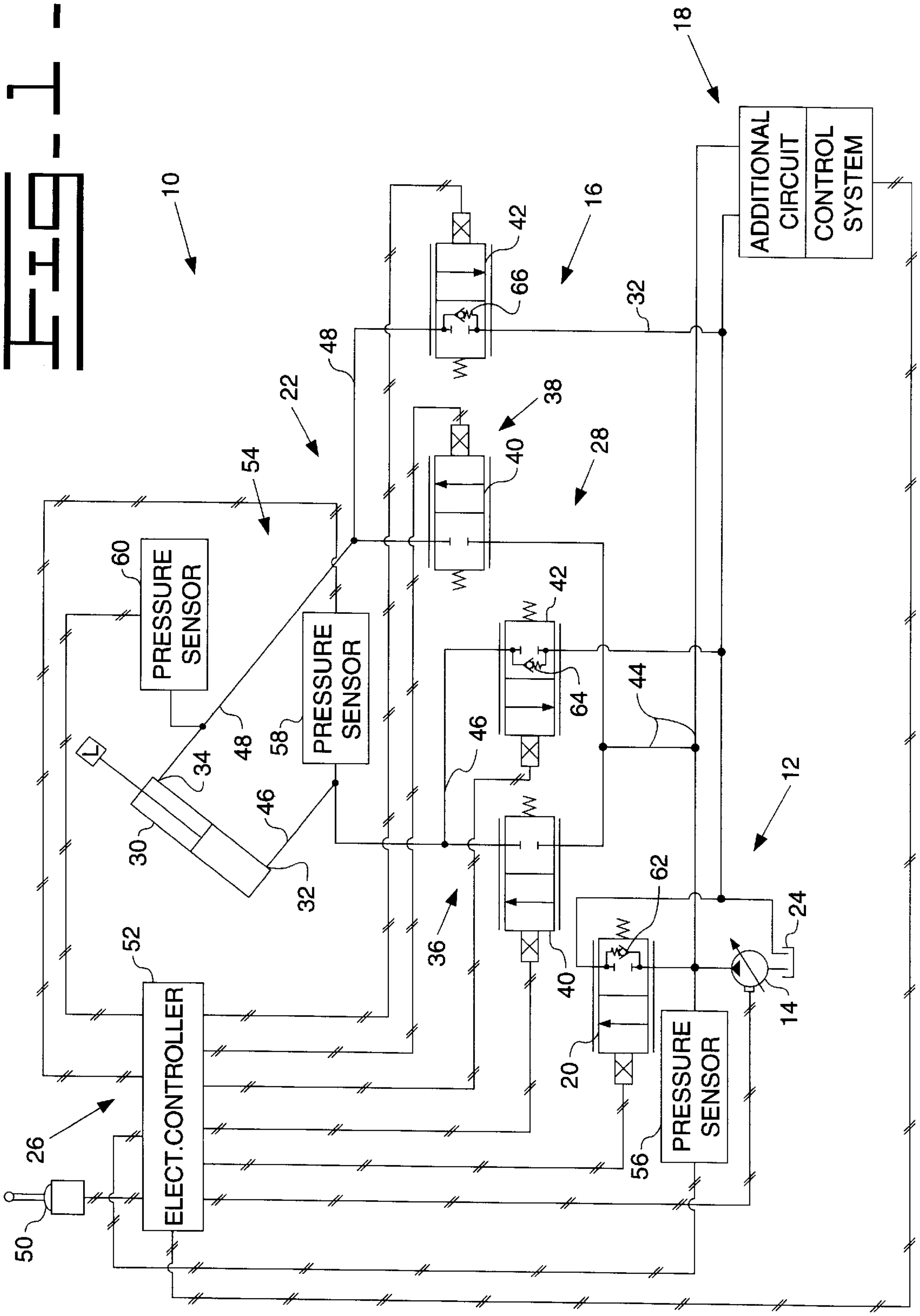
FIG. 1 is a schematic representation of a fluid system incorporating the subject invention.

Referring to FIG. 1 of the drawings, a fluid system 10 is illustrated and includes a source of pressurized fluid 12, such as a variable displacement pump 14, first and second hydraulic circuits 16,18, an electrically controlled bypass valve 20, a fluid conduit network 22, a reservoir 24, and a control arrangement 26.

For the subject invention, the source of pressurized fluid 12 could be the pressure level at any place within the fluid conduit network 22 without departing from the essence of the subject invention. The pressure level in any part of the fluid conduit network 22 could be generated by the pump 14, the magnitude of the load, changes in the velocity of the actuator or any other parameter in the fluid system 10 that is capable of generating a pressure on the fluid at that location. Even though only first and second hydraulic circuits 16,18 are illustrated, it is recognized that additional circuits could be used without departing from the essence of the invention.

Since the first and second hydraulic circuits 16,18 are substantially the same, only the first one of them is illustrated and described herein. The first hydraulic circuit 16 includes an electrically actuated control valve mechanism 28 and a fluid actuator 30 having a first inlet/outlet port 32 and a second inlet/outlet port 34. In the subject embodiment, the electrically actuated control valve mechanism 28 includes first and second electrically controlled proportional valves 36,38 and each of the first and second electrically controlled proportional valves 36,38 include first and second electrically controlled metering valves 40,42. Each of the first and second electrically controlled proportional valves 36,38 function in the same manner to control the flow into and out of the respective inlet/outlet ports 32,34.

A supply conduit 44 is part of the fluid conduit network 22 and connects the pump 14 to the first electrically controlled metering valve 40 of the respective first and second electrically controlled proportional valves 36,38. A first conduit 46 connects the first electrically controlled metering valve 40 of the first electrically controlled proportional valve 36 with the inlet/outlet port 32 of the fluid actuator 30 and a second conduit 48 connects the second electrically controlled metering valve 42 of the second electrically controlled proportional valve 38 with the second inlet/outlet port 34 of the fluid actuator 30.

The first electrically controlled metering valve 40 of the second electrically controlled proportional valve 38 connects the source of pressurized fluid 12 to the second inlet/outlet 34 while the second electrically controlled metering valve 42 of the first electrically controlled proportional valve 36 connects the first inlet/outlet port 32 of the actuator 30 to the reservoir 24.

The control arrangement 26 includes an input controller 50 operatively connected to an electronic controller 52. The input controller 50 directs an electrical signal to the electronic controller 52 representative of the operator's input and the electronic controller 52 directs a proportional electrical signal to the electrically actuated control valve mechanism 28 to perform the desired function.

A pressure sensor arrangement 54 includes a first pressure sensor 56 connected to the supply conduit 44 and operative to direct an electrical signal to the electronic controller 52 that is representative of the pressure of the fluid in the supply conduit 44. Second and third pressure sensors 58,60 are respectively connected to the first and second conduits 46,48 and operative to direct electrical signals representative of the pressure in the respective conduits 46,48 to the electronic controller 52. It is recognized that other pressure sensors could be connected to other parts of the fluid system 10 without departing from the essence of the subject invention.

A control scheme, such as that set forth in U.S. Pat. No. 5,813,226, is provided in the electronic controller 52 and operative to sense and predict pressure overshoot or overpressure in portions of the fluid system 10 and function to move the appropriate valve of the electrically actuated control valve mechanism 28 to relieve the over-pressure in the fluid system 10. The control scheme functions to anticipate an over-pressure condition by continuously sensing the rate of increase of pressure in a conduit and if the rate of pressure rise continues to increases at the same rate overpressure would occur. The electronic controller 52 sends an electrical signal to the appropriate control valve to initiate movement of the control valve towards an open position prior to the over-pressure condition occurring. If the rise in pressure continues to the over-pressure condition, the appropriate control valve moves to an open position to bypass fluid thus relieving the over-pressure condition.

A first low flow pressure relief valve 62 is disposed in the electrically controlled bypass valve 20, respective second and third low flow pressure relief valves 64,66 are disposed in the second electrically controlled metering valve 42 of the respective first and second electrically controlled proportional valves 36,38. Each of the respective low flow pressure relief valves 62,64,66 is operative to open to bypass a small volume of fluid once the pressure acting thereon reaches a predetermined maximum pressure level.

Figure 2:
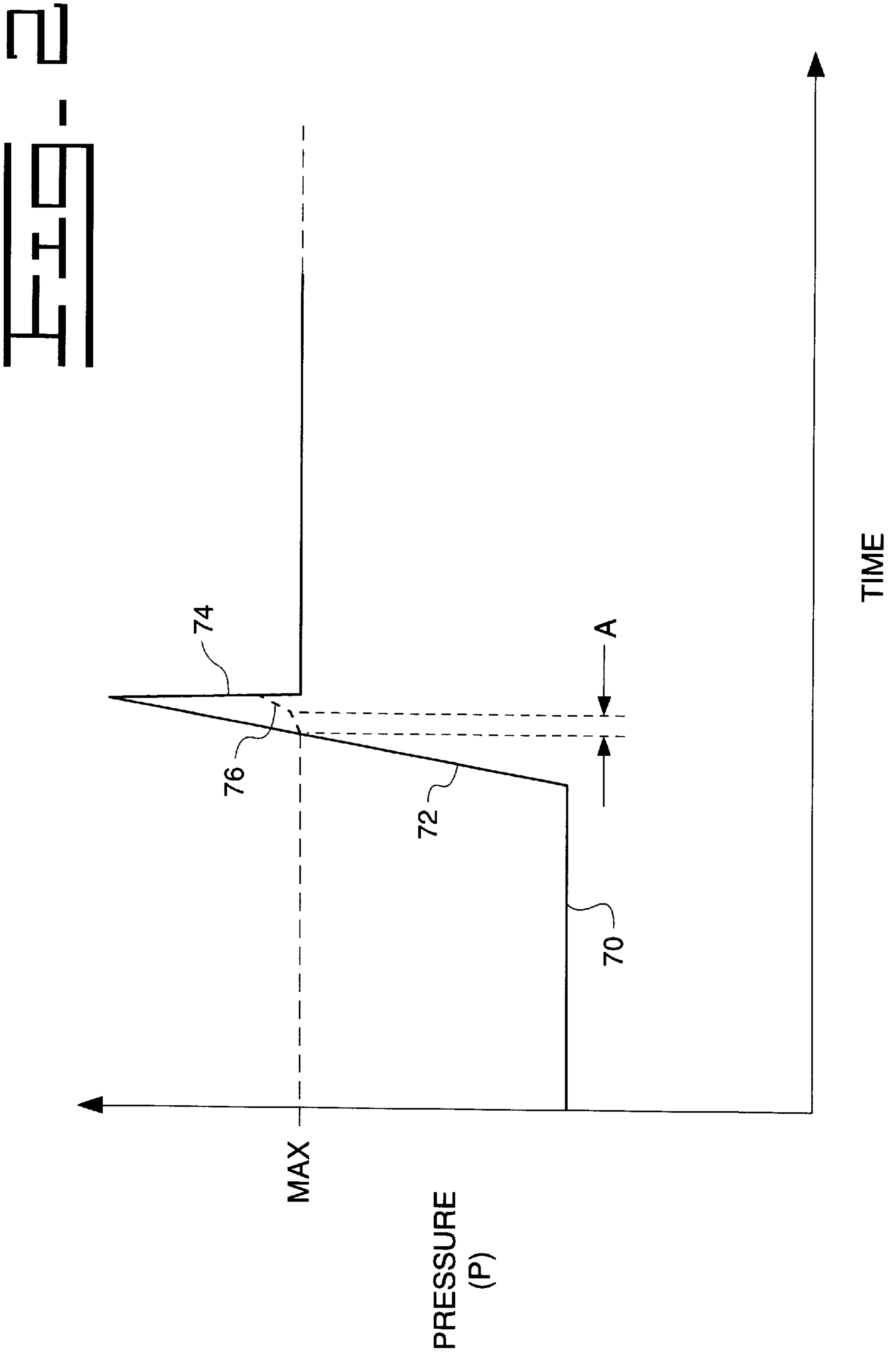
FIG. 2 is a graph illustrating the relationship between system pressure and the rate of pressure rise with respect to time.

Referring to FIG. 2 in conjunction with FIG. 1, a graph is illustrated to show the affect of the low flow pressure relief valves 62,64,66 on the control of over-pressure relative to time. The vertical axis represents pressure within the fluid conduit and the horizontal axis represents time. Line 70 represents steady state operation of the actuator 30 and line 72 represents an increase in the pressure as a result of a change in at least one of the system parameters (i.e., a sudden stopping of the load). As illustrated the increase in pressure is far exceeding the desired maximum pressure level (MAX) due primarily, at times, to the fact that the rate of pressure increase is more rapid than then can be anticipated and acted upon by the control scheme. The line 74 represents the decrease in pressure once the appropriate control valve opens to relieve the pressure. The dashed line 76 represents the effect of the opening of the low flow pressure relief valve 62/64/66. The horizontal distance "A" represents the off-set of time that is achieved by the low flow pressure relief valve prior to the pressure continuing to increase. However, the time off-set is sufficient to control the magnitude of the over-pressure condition.

Figure 3:
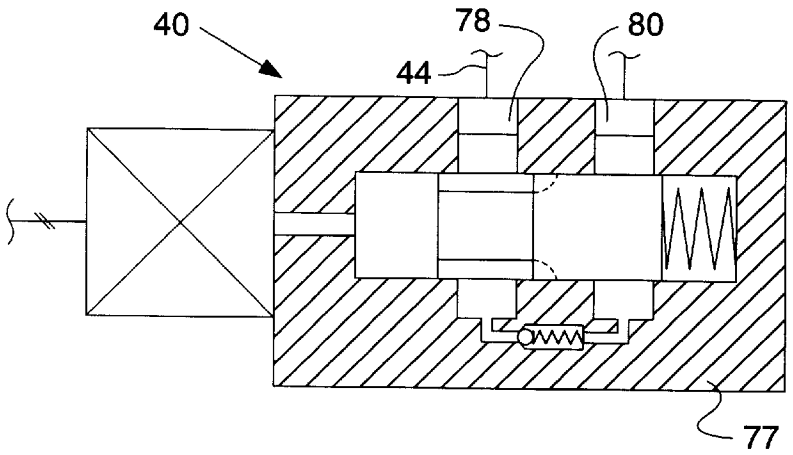
FIG. 3 is a diagrammatic representation of an electro-hydraulic control valve incorporating a portion of the subject invention.

FIG. 3 is a diagrammatic representation of an electrically controlled spool type metering valve 20/42 having a housing 77 with an inlet port 78 and an outlet port 80. In the subject arrangement of FIG. 1, the inlet port 78 is connectable to the conduit 46/48 or the supply conduit 44 depending on the location of the spool type metering valve 20/42. The outlet port 80 is connected to the reservoir 24. It is recognized that the outlet port 80 could be connected to any low pressure area without departing from the essence of the subject invention. The low flow pressure relief valve 62/64/66 is disposed within the housing 77 between the inlet and outlet ports 78,80 and operative to permit flow from the inlet port 78 to the outlet port 80 when the pressure at the inlet port 78 reaches a predetermined pressure level.

Figure 4:
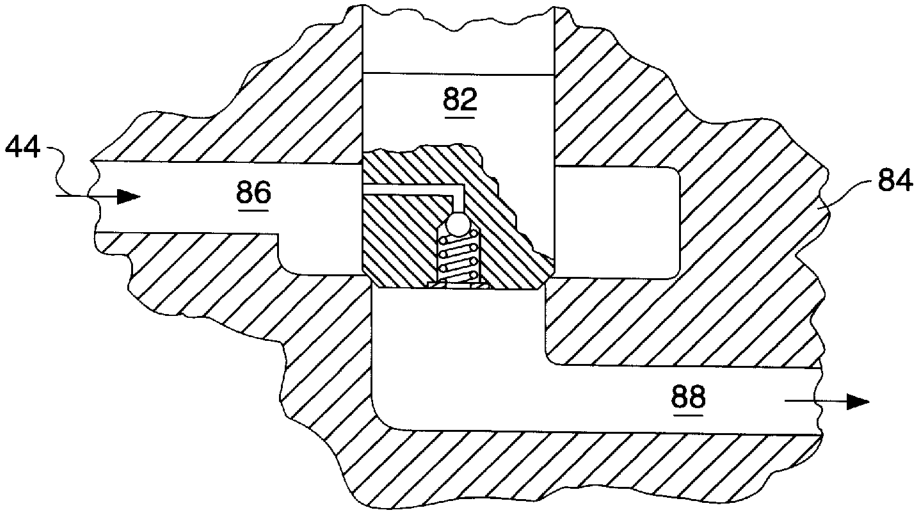
FIG. 4 is diagrammatic representation of another control valve incorporating a portion of the subject invention.

FIG. 4 is a diagrammatic representation of an electrically controlled poppet type metering valve 20/42 having a control poppet 82 disposed in a housing 84 between an inlet port 86 and an outlet port 88. As set forth above with respect to FIG. 3, the inlet port 86 of the poppet type metering valve 20/42 is connectable to the conduit 46/48 or the supply conduit 44 depending on the location of the poppet type metering valve 20/42. The outlet port 88 is connected to the reservoir 24. It is also recognized that the outlet port 88 could be connected to any low pressure area without departing from the essence of the subject invention. The low flow pressure relief valve 62/64/66 is disposed within the poppet 82 between the inlet and outlet ports 78,80. It is recognized that the low flow pressure relief valve could be disposed within the housing 84.

It is recognized that the first and second electrically controlled proportional valves 36,38 could be of the split spool type. That is, the first and second electrically controlled metering valves 40,42 could be combined into one valve that controls the flow into and out of the respective first and second inlet/outlet ports 32,34 of the actuator 30. The respective low flow pressure relief valves 64,66 would then be located in the appropriate split spool arrangement to vent pressurized fluid from the actuator to the reservoir. Likewise, even though the low flow pressure relief valves 62,64,66 are illustrated as being within the associated control valves, it is recognized that they could be connected in parallel between the respective fluid conduits 44,46,48 of the fluid conduit network and the reservoir 24. Additionally, the low flow pressure relief valves 62,64,66 could each be opened in response to receipt of an electrical signal as sensed by the pressure sensors 56,58,60 from the electronic controller 52 as opposed to being acted upon directly by the pressure in the respective fluid conduits of the fluid conduit network 22.

Industrial Applicability

In the operation of the subject invention, if a sudden pressure increase occurs, such as that illustrated in FIG. 2, as a result of a change in one of the system parameters, the control scheme acts to predict that the pressure increase, if it continues to increase, will exceed the maximum pressure level. As a result of this prediction, the appropriate one of the control valves moves towards an open position prior to the maximum pressure level being reached and if the pressure increase continues, the control valve moves to an open position to relieve the over-pressure condition. Additional details of one example of the control scheme can be had, if desired, by referring to the above noted U.S. Pat. No. 5,813,226.

For example, if the pressure level in the first conduit 46 suddenly increases, the pressure sensor 58 senses the increase and the control scheme in the electronic controller 52 predicts that if the rate of pressure increase continues the pressure level will exceed the maximum pressure level. The control scheme through the electronic controller 52 preconditions the second electrically controlled metering valve 42 to move towards, but short of an open position. At the next instant, if the pressure is still increasing and an over-pressure condition is imminent, the metering valve 42 moves to a partially open position to bypass some fluid in order to alleviate the over-pressure condition. If the metering valve 42 does not get to an open position quick enough as illustrated by the line 72 in FIG. 2, the low flow pressure relief valve 64 opens to bypass a small amount of fluid to off-set the time needed, as set forth by the dashed line 76 of FIG. 2, to get the metering valve 42 to an open position. Since the relief valve 64 is a low flow valve, it will become saturated quickly and the pressure will again begin to raise. However, sufficient time has elapsed to permit the metering valve 64 to open as set forth in FIG. 2 by line 74. Consequently, the control system has eliminated the major portion of any over-pressure condition while not requiring large, more expensive high flow pressure relief valves.

The other low flow pressure relief valves 62,66 work in combination with the control scheme in the same way to control the major portion of any over-pressure condition if the control scheme cannot act quick enough to control the pressure increase as it reaches the desired maximum pressure level. Additionally, if all of the control valves are in their blocked position, the respective low flow pressure relief valves 62,64,66 act to relieve any increased pressure therein due to thermal expansion of the fluid. Subject to different requirements within the fluid system 10, each of the conduits within the conduit network 22 could have different maximum pressure requirements. Thus, the control scheme would react to a different pressure level in the respective conduits and the appropriate low flow pressure relief valve 62,64,66 would be set at different levels as required by the system requirements.

Other aspects, object and advantages of the invention can be obtained from a study of the drawings, the disclosure and the appended claims.

What is claimed is:

1. A control arrangement for offsetting the rate of pressure rise within a fluid conduit network of a fluid system having a source of pressurized fluid, a reservoir, a fluid actuator, an electrically actuated control valve mechanism connected to the source of pressurized fluid, the reservoir and the fluid actuator, the fluid conduit network of the system having a predetermined maximum operating pressure level, the control arrangement comprising:

an input controller connected to the electrically actuated control valve mechanism and operative to generate an electrical signal representative of the desired input;

an electronic controller operative to receive the signal from the input controller and direct an output signal therefrom to the electrically actuated control valve mechanism;

a pressure sensor arrangement operative to sense the pressures within the conduit network of the fluid system and deliver a signal representative thereof to the electronic controller;

a control scheme operative in response to the sensed pressure signals to anticipate a pressure level that would exceed the predetermined maximum pressure level and direct an electrical signal to the electrically actuated control valve mechanism to bypass a portion of the fluid flow in the system to the reservoir to relieve the overpressure condition; and a low flow pressure relief valve disposed between the conduit network and the reservoir and operative in response to the pressure level in the conduit network exceeding the predetermined maximum pressure level to bypass a small volume of pressurized fluid to trim the level of any over-pressure condition.

2. The control arrangement of claim 1 wherein the conduit network includes first and second conduits and the actuator has first and second inlet/outlet ports and the electrically actuated control valve mechanism includes a first electrically controlled proportional valve mechanism connected to the first inlet/outlet port of the actuator through the first conduit and a second electrically controlled proportional valve mechanism connected to the second inlet/outlet port through the second conduit, and the low flow pressure relief valve is disposed between the second conduit and the reservoir.

3. The control arrangement of claim 2 wherein the low flow pressure relief valve is disposed within the second electrically controlled proportional valve mechanism.

4. The control arrangement of claim 3 wherein the second electrically controlled proportional valve mechanism includes a first electrically controlled metering valve connected between the source of pressurized fluid and the second inlet/outlet port and a second electrically controlled metering valve connected between the second inlet/outlet port and the reservoir, and the low flow pressure relief valve is disposed in the second electrically controlled metering valve.

5. The control arrangement of claim 4 wherein the second electrically controlled metering valve is a spool type valve having an inlet port and an outlet port and the low flow pressure relief valve is disposed therein between the inlet port and the outlet port.

6. The control arrangement of claim 4 wherein the second electrically controlled metering valve is a poppet type valve having an inlet port and an outlet port and the low flow pressure relief valve is disposed therein between the inlet port and the outlet port thereof.

7. The control arrangement of claim 1 wherein the electrically actuated control valve mechanism includes an electrically controlled bypass valve disposed between the source of pressurized fluid and the reservoir and the low flow pressure relief valve is disposed in the electrically controlled bypass valve.

* * * * *